Nov. 3, 1942.  C. E. SCHEURING  2,300,527
PERIPHERAL FLANGE FORMATION APPARATUS
Filed April 20, 1940  2 Sheets-Sheet 2
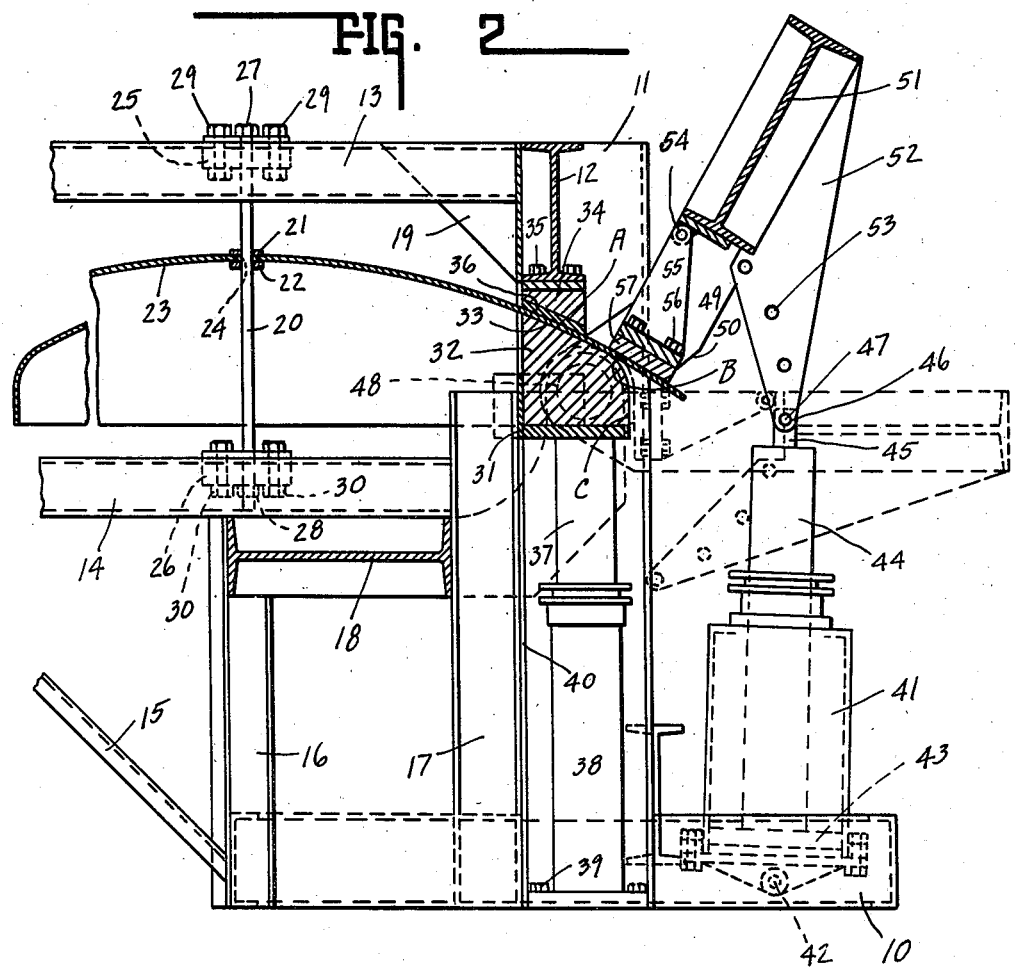
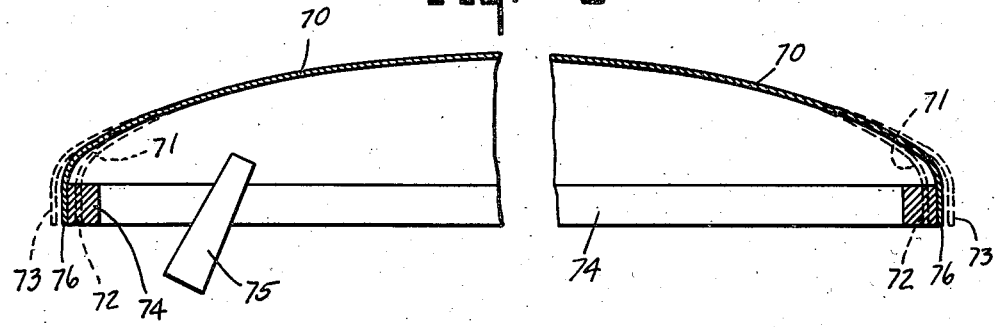
INVENTOR.
CHARLES E. SCHEURING.
BY Lockwood, Goldsmith & Galt.
ATTORNEYS.

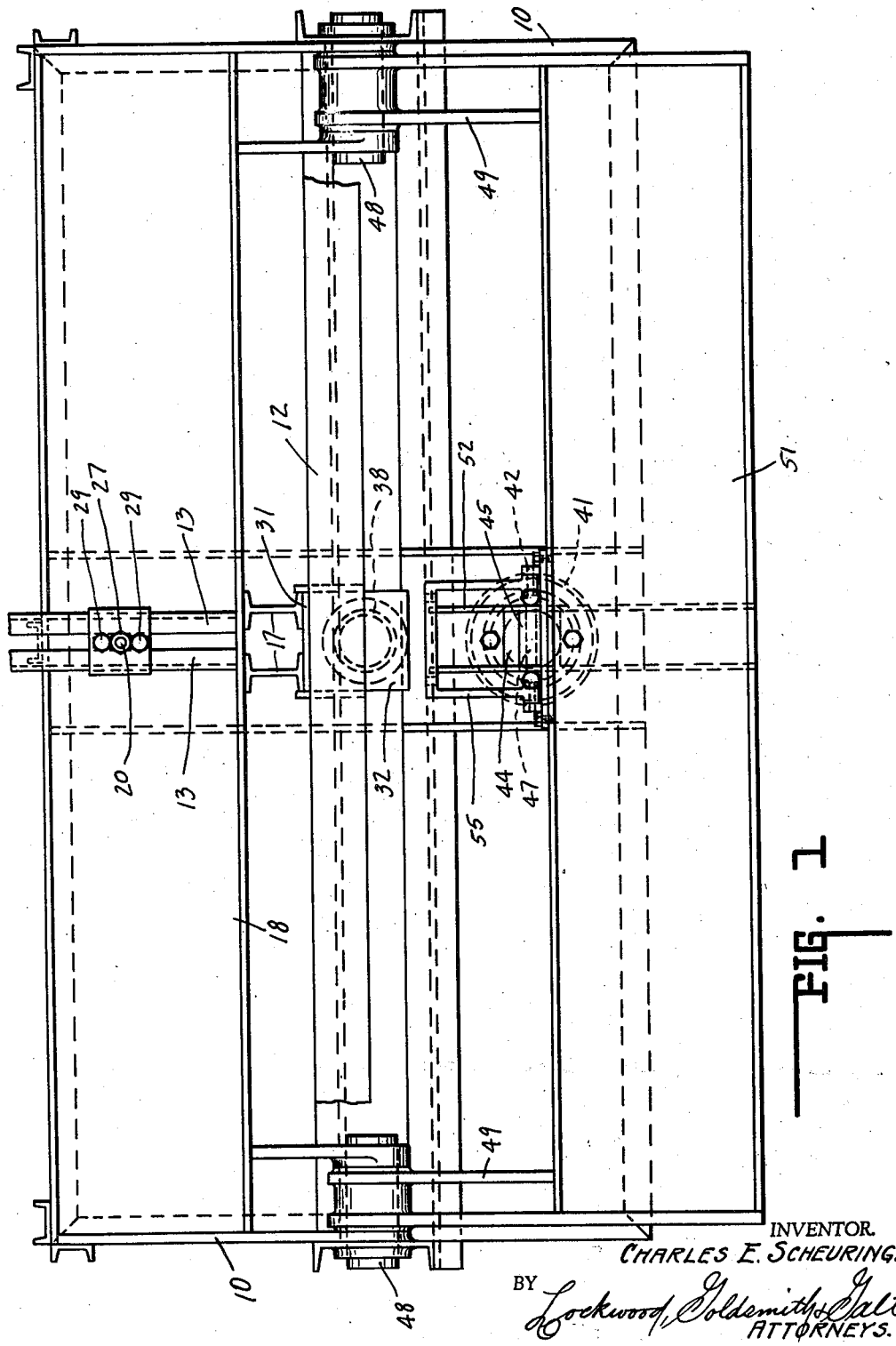

Patented Nov. 3, 1942

2,300,527

UNITED STATES PATENT OFFICE 2,300,527

PERIPHERAL FLANGE FORMATION APPARATUS

Charles E. Scheuring, Indianapolis, Ind.

Application April 20, 1940, Serial No. 330,666

3 Claims. (Cl. 153—16)

This invention relates to apparatus for forming steel heads of tanks of large size and more especially tanks of stainless steel material.

High chrome-nickel steel, more especially known as Austenitic stainless steel, has a characteristic known as work hardening so that it is extremely difficult to deform from the flat sheet. The material furthermore has properties that limit its severe working at certain temperatures. Furthermore, conventional requirement limitations are such that working the material is quite difficult. Also, the inherent characteristics of the material are such that in large sizes and relatively lighter thicknesses, certain formations not desired tend to occur.

The present invention has for its object apparatus for the processing of such steel sheets whereby tank heads, according to the requirements of the industry, may be fabricated and without special treatment and to proper dimension and having a variation of not to exceed ¼" in 6-ft. diameter, and by practicing an additional step of the process, this variation may be reduced to $\frac{1}{16}$" or less for a 6-ft. diameter head. Furthermore, this form of the invention readily lends itself to the production of rather elongated flanges or collars on said heads heretofore impossible to attain other than by welding a collar to the head.

The basic process is capable of variation as required by conditions, as will be hereinafter more fully pointed out.

The chief feature of the invention consists in clamping the blank from which the head is fabricated and adjacent the junction of the collar to be formed thereon and then forming the collar in a series of sequential power applications while the blank is held, the deformation in certain instances being unaccompanied by the application of heat and in other instances it being necessary to employ local heat.

The apparatus of the present invention is a discovery predicated upon an intensive study of the characteristics of stainless steel and numerous experiments over a period of several years and the process followed, so far as is now known, is the only process by which stainless steel may be satisfactorily fabricated to finish desired, and to dimensional requirements specified and with a collar or flange of appreciable length.

For a complete understanding of the invention reference is had to the following description which initially will briefly outline the process and then will describe one embodiment of a machine for practicing the process and in the latter connection, reference will be had to the attached drawings.

If it be assumed that it is desired to produce a tank head of stainless steel having an analysis of 18-8, and wherein the knuckle radius does not exceed 1" and the straight flange or collar does not exceed 1", such a head can be formed without utilizing any heat in the deforming operation and the procedure is substantially as follows:

The flat plate or sheet is cut in the form of a circle, the diameter of which is, of necessity, in excess of the diameter of the finished head. This diameter of the circle is determined by a formula in which the finished diameter, thickness of material, spherical radius, if any, knuckle radius and length of straight flange, are utilized. The finished diameter mentioned is the diameter of the overall finished circular object. The thickness of the material, of course, is the thickness of the sheet. If the tank end is to be bulged or bowed, it will have a spherical radius. If it is to be flat, its spherical radius, of course, is infinity. The knuckle radius is that radius which is used to strike the arc that joins the flat or curved surface of the major portion of the head to the flange or collar.

The A. S. M. E. Code specifies the knuckle radius shall be not less than 6% of the spherical radius or finished diameter. If the spherical radius is 68" and the diameter is 68", 6% of either is 4.08" and the same is the knuckle radius. Since the Code specifies this shall be the minimum, a 4⅛" knuckle radius is satisfactory. The formula then for a 68" spherical radius head of 68" tank diameter will require that the flat sheet must be cut approximately 78" in diameter to provide a 4" straight flange or collar. This circular sheet then is dished between two dies with matching spherical surfaces, the dies being mounted in a suitable base arrangement. The size and radius of the dies is determined by experimentation inasmuch as the plates as they are received from the mill vary in their ductility, according to the heat treatment to which they have been subjected and their specific analysis.

In the present example, the 78" disc is first dished to a 68" spherical radius. It is then punched or drilled in the center of this circle for centering the dished plate in the flanging machine and the material then is ready for flanging. Naturally, if the head is flat this dishing operation is omitted.

Briefly, the flanging machine progressively breaks down the peripheral edge of this sheet, whether dished or flat, to form the knuckle portion between the collar or flange and the main portion of the head. This progressive breaking down is, as stated, progressive in that it occurs step-by-step entirely about the circumference. Depending upon the length of collar desired, such sequential, progressive, circumferential breakdown, general operation may be repeated and as many times as required.

It is important to note that each individual break-down operation is a relatively small amount, linearly, because if a larger amount were broken down, the wrinkling tendency of this particular material, and which cannot be eliminated, would provide in the finished product undesirable wrinkles that could not be effaced by any subsequent fabrication or by a fabrication finishing step which is not unduly expensive.

The present invention, therefore, secures this fabrication within that range of wrinkling action wherein the wrinkles, if formed, are relatively small so that they may be readily and economically effaced and held to a minimum. After the material has once taken a definite set incident to successive deforming, as stated, it is extremely difficult to remove that set. As previously set forth, no heat is required to form a head.

In forming heads with a knuckle radius in excess of 1″ or with a straight flange or collar in excess of 1″ and if the material be of stainless steel, it must be heated in the formation of the flange. What has been previously described applies to a purely cold process. When the dimensions are such that the limitations are as noted, the plate must be heated after it is clamped and before the bending operation is formed on the clamped plate. It has been found this heating must be closely controlled as to the area heated and the temperature to which that area is heated. It also has been found a small volume flame of high temperature is preferable. This local heating changes the internal structure of certain types of stainless steel and whenever that occurs, it is necessary that the completed head be annealed. This is done by heating the head in a furnace of conventional design and then quenching the heated head when it is withdrawn from the furnace, the heat application being that necessary to properly anneal said head.

The process thus defined briefly is performed on a flanging machine insofar as the basic sequential deforming is concerned and such flanging machine is of such character as will be more fully set forth hereinafter, and the heads thus formed are within ¼″ plus or minus in diameter specified.

Whenever it is desired that closer limits be held, the following procedure is employed: There is formed a ring of carbon steel with a removable wedge. This ring has an outside circumference equal to the required inside circumference of the conventional head. This ring is cold steel at least three times thicker than the thickness of the material in the head. The head after being removed from an annealing furnace or oven, has this cold steel ring placed inside of it and then the head is quenched which shrinks the flange of the head on to the ring. As a consequence, the head is stretched as it shrinks on the ring. When the head is cool, the wedge is removed from the ring and the ring is easily removed from the head.

It is to be observed that when this last operation or sequence of steps is to be utilized, the center hole mentioned hereinbefore and utilized as a center for rotating the disc in the flanging operations is required to be set ⅛″ closer than is normally required. The head with the center opening so set in closer relation, when it is removed from the flanging machine, therefore, is slightly smaller in diameter by at least ¼″ than the requirement for the finished head diameter. Heating enlarges the head diameter for stretching ring reception and the stretching ring then holds the head to the desired diameter until it holds that diameter.

As will be apparent from the foregoing description of the basic process and its several exceptions, the basic process consists in the sequential limited flanging formations and the repetition thereof as often as required, and with or without the utilization of heat, depending upon the specific material utilized and the size of the knuckle radius and collar or flange.

The following description will set forth more fully the specific flanging operation by referring to an embodiment of a machine capable of operating upon the material as described.

In the several figures of the drawings, like parts are designated by like numerals and other objects and features of the invention will be set forth more fully hereinafter.

In the drawings Fig. 1 is a top plan view of a flanging machine embodying the invention, the head being omitted therefrom for clearness.

Fig. 2 is a central sectional view through the machine with the dished head applied thereto and shown in central section, dotted lines indicating the finished head and dotted lines indicating a second position of the movable flanging elements.

Fig. 3 is a central sectional view of the head after flanging, following annealing and with the sizing ring structure applied thereto.

Reference now will be had to Figs. 1 and 2. In the drawings, the numeral 10 indicates a pair of side members and extending upwardly therefrom and intermediate the ends, are the members 11. At their upper ends these members are connected by the I-beam 12. Extending laterally therefrom and adjacent the midportion is the structural arrangement 13, and therebeneath, is the parallel structural arrangement 14. There also is provided the spaced pairs of upright portions 16 and 17. The I-beam 18 therebetween extends across the machine for bed purposes. The members 13 are connected to the I-beam 12 by the gusset plates 19. Members 14 are braced as at 15.

Slidable between the spaced members 13 and 14 is the adjustable centering pin or shaft member 20. It mounts shaft collars 21 and 22 and these are positioned above and below the dished plate, indicated by the numeral 23, the shaft or pin 20 extending through the hole 24 punched or drilled through the dished plate.

Slidable on the spaced members 13 is the crosshead structure 25 and slidable on the spaced members 14 is the crosshead structure 26, and the shaft 20 is connected to these crossheads as indicated at 27 and 28, respectively, the crossheads being secured in rigid relation to these supporting members, as indicated at 29 and 30, respectively. It will be apparent that very little support is required for the plate generally. The sole requirement is that the plate be centered for rotation and be capable of rotation.

As shown clearly in Fig. 2, there is provided below the I-beam 12 a box structure 31 forming a pocket which receives an inside die 32 faced as at 33, this facing corresponding to the spherical curvature of the plate, if of dished character, the portion conforming to that generated by the desired knuckle radius and a portion conforming to that of the depth of flange. These portions are designated by the letters A, B and C, respectively.

Thereabove there is secured a stool which is of fabricated steel and having a lead surface, if desired, and conforming to the portion A of the die structure 32—33. This stool is indicated by the numeral 34 and is detachably secured to the I-beam as at 35 and has its conforming face designated by the numeral 36. It is to be understood that the inside die is a cast iron block, or the like, and is about 10" long and has a spherical radius portion A, as indicated, if the finished head is dished, and has the required knuckle radius as indicated at B if required, and the desired straight flange as indicated at C, if required, in the finished head. The width of the portion A is only about 4". The length of the portion 32, as stated, and as shown in Fig. 1, is about 10" and naturally it is curved to conform to the inside diameter of the collar.

The box 31 is carried by a clamping jack structure 37 and the same is connected to a piston mounted in a cylinder 38. The piston and jack comprise a single unit. The cylinder is rigidly supported at its base, as indicated at 39, and the box structure is slidably supported in the guideways 40. From the foregoing, it will be obvious that when the piston is extended upwardly it moves the jack portion upwardly together with the box and the inside die and thus the dished head is clamped between the face of the inside die and the face of the stool. While the dished head is thus held stationary, the flanging operation is performed. When that is performed, the jack is lowered a sufficient amount to release the dished head from clamping operation and the head is then rotated the desired amount for the second flanging operation. The entire periphery is thus treated.

Positioned in substantial alignment with the shoe and the shaft, is a power cylinder 41 pivotally mounted at 42 at its lower end to the base structure including members 10. Mounted therein is a piston 43 and the same terminates in an exposed portion 44 carrying an extension 45 apertured as at 46 to receive a pin 47.

Pivotally supported as at 48, and herein on the inside of the two upright members 11, are the arms 49 which are offset as indicated at 50, and the free ends of these offset arm portions are connected together by the I-beam 51. Secured to the central portion thereof and depending therefrom is the plate 52 having apertures 53 therein upon the arc of a circle substantially coincident with the center 48. A pin 47 is adapted to adjustably and detachably connect this plate and, therefore, the swinging beam construction, to the member 45 connected to the flanging piston. Pivotally mounted at 54 and central of the swinging beam construction is the support arrangement 55, the forward face of which detachably supports as at 56 the forming shoe 57.

It is to be observed that the face of the inside die is finished as required or desired, so as to preserve the finish on the plate if the requirement of the finished tank demands a fine finish on that surface. This inside die may be loosely mounted in the pocket structure or may be detachably mounted therein.

The swinging beam structure is raised to the top position beyond the full line position shown in Fig. 2 for plate insertion and mounting and after the plate is mounted, the beam is lowered until it rests on the plate. The piston of the air cylinder 41 then is elevated its maximum amount or more until the hole 46 registers with the closest hole 53 and thereupon the pin 47 is inserted in these registering holes. The machine then is ready to operate. The sequence of operation of the flanging device described is as follows:

After the plate has been properly mounted on the shaft and the stool and inside dies have been properly positioned, power is applied to the clamping jack which is elevated until the plate is clamped between the stool and die. This clamping action is held during the flanging operation. While the plate is so clamped, power is applied to the piston in cylinder 41 to pull down on the swinging beam and then forming shoe 59 on its down stroke deforms the metal of the sheet 23. This down-stroke is limited so that the bend is only a part of the complete formation as shown in the central portion of Fig. 2. The swinging arm then is raised, the clamping jack released and the head revolved a distance which will produce uniformly spaced waves in the edge of the steel which are determined by the thickness of the material being worked. After this amount of rotation, the jack is raised for plate clamping, then the swinging beam is lowered an amount corresponding to that previously utilized, and this sequence of operation is continued until the head has been rotated one complete revolution.

The pin 47 is removed and replaced in a hole 53 higher up in the swinging beam plate 52 so that the same operations again may be performed for a complete revolution of the head plate, the plate during this series of formings being bent still closer to the inside die. It is to be noted the bottom of the waves in the plate are against the inside die block and there are formed a series of "high" spots uniformly spaced around the flange of the head at the completion of this cycle. A third shift, if necessary, then is made with respect to the connection between the plate 52 and the member 45 and the previous operations are continued except that instead of working on a new area of the plate, the forming shoe now engages the high spots previously formed and a succession of flanging operations serves to eliminate these high spots and the previous wave formation.

Insofar as the particular head is concerned, which is illustrated in Fig. 2, it is to be noted that it cannot be worked cold. In other words, it has been ascertained the approximate limits of cold working without introducing wrinkles that could not be subsequently removed in stainless steel of the character indicated is a head with a knuckle radius of approximately 1" and a flange of approximately 1". When the knuckle radius is greater and/or the flange is greater, heat treatment must be utilized as previously described.

This heat treatment is applied by a torch applying a small volume flame of high temperature to that portion of the sheet to be worked at the next succeeding flanging operation so that the heated portion of the sheet is positioned, immediately following the heating, in registration with the stool and inside die insofar as radial registration is concerned so that the hot metal then may be worked with the forming shoe. The time cycle of the operation is such and the controls are such that the operator may direct the flame onto the metal to be heated and hold it there while the beam is flanging the previously heated area of the head. When that operation is completed and the beam is returned to the upper position, the clamping jack is lowered an amount sufficient to clear the sheet and then the sheet is rotated so as to bring the heated area in registration with the flanging station, as aforesaid. The clamping jack then is actuated, the sheet held and the forming shoe completes the flanging operation and during the latter, the next area is being heated.

When light gauge metal is used and cannot be readily "worked" cold, the heating step occurs during the working step, that is, the local area is heated while and where clamped and then worked because of the rapidity of dissipation of heat during the translation step.

It will be quite evident and obvious that the amount of rotation may be automatically performed by any conventional indexing device or construction. However, due to the peculiarities of the material, to wit, stainless steel, and its unpredictable actions, it is preferred that the indexing be of hand character because if an excessive amount of indexing occur, an objectionable wrinkle will be formed that will be extremely difficult, if not impossible, to subsequently remove. It might be added that considerable experience is required on the part of the operator before such operator is sufficiently skilled to fabricate material of this character and into these particular shapes having these particular types of dimensions. A single error in judgment in the application of heat or flanging movement or indexing may serve to permanently ruin a sheet.

It may be parenthetically set forth that in order to provide a dished head of about 6 ft. in diameter with a flange about 1½" to 2" in length will require a full working day or slightly less while the formation or flanging of a special diameter head with a 4" collar or flange will require approximately 2 days. In other words, the longer or deeper the flange the greater the time of operation required and this is not in direct proportion but the time progressively increases over the direct proportion due to the inherent character of the material and the fact that it work-hardens and, therefore the more work that is done to it the greater is the difficulty encountered in deforming it to final form.

It will be quite obvious that the controls for the application of power to the clamping jack and to the swinging beam pistons may be of such character as to be automatic or semi-automatic, the cycle, however, being operator initiated. Automatic indexing mechanism and controls of the manual, semi-automatic and full automatic type, as herein mentioned, are old and well known in die machinery and for that reason and in the interest of clearness, a description of any of the aforesaid is intentionally omitted but such omission is not to be construed as eliminating the inclusion thereof from the scope of this invention.

Reference now will be had to Fig. 3. In this figure the numeral 70 indicates the body or main portion of a dished head. The dotted lines 71 represent the knuckle radius portion thereof and the dotted lines 72 extensions of the former represent the flange portions thereof of a head finished upon the flanging machine and by the process previously described. This head of this shape is as stated previously, then placed in the annealing oven and heated and the head enlarges as indicated by the dotted lines 73 in Fig. 3.

When the head has enlarged to this extent, there is mounted in it the iron ring 74 having the steel wedge 75, included therein. The head, with the included ring therein, then is quenched and the collar portion shrinks to the ring, as indicated at 76. The cold head after it has been shrunk to the ring and set to that diameter, then has the wedge 75 removed from the ring and the ring is readily removed from the head, leaving the head in finished form and of the desired interior diameter which will be within $\frac{1}{16}$" plus or minus of the same.

It also might be herein noted that one of the chief characteristics of the structure of the flanging machine is that the pivotal support for the swinging beam is substantially coincident with the center of the knuckle radius and also that the machine as fabricated, has a length insofar as members 13 and 14 are concerned, of approximately 6 ft. so that the machine by reason of the adjustable mounting of the shaft, can accommodate heads at least up to 10 ft. in diameter.

Furthermore, it is noted that the head part which is being operated upon in the flanging machine is that which is rigidly securing during the flanging or deforming operation and furthermore, that the depth of throat between the I-beam 12 and the box 31 is sufficient to accommodate any dished head of reasonable spherical radius.

It also will be noted the flanging operation and clamping operation all occur medianly of the machine, and, therefore, at the middle of the throat width reference being had to a horizontal section through the throat and the circular metal sheet, whether dished or not, recedes from the side members 11 when the sheet or head is properly mounted in the machine.

The clearance is such between the I-beam portion 51 and the vertical members 11 and the clamping jack, that an operator may stand within the swinging beam so as to properly manipulate the torch for local area heating, as previously described.

It might be added that the width of the machine as shown in Fig. 1 is approximately 10 ft. and the portion 55, the forming shoe, and the cylinder 41 only occupy about the central 18" of this area, so that, there are approximately 2 ft. available between the I-beam and the other portion of the machine for operator positioning.

While the invention has been illustrated and described in great detail in the drawings, and foregoing description, the same is to be considered as illustrative and not restrictive in character.

The several modifications described herein as well as others which will readily suggest themselves to persons skilled in this art, all are considered to be within the broad scope of the invention, reference being had to the appended claims.

The invention claimed is:

1. Metal head collar forming apparatus including in combination a frame arrangement with a wide throat therein, head clamping and bending means in juxtaposition to the throat, and medianly positioned relative thereto, the bending portion of said means being positioned generally to one side of the frame arrangement, other frame means extending oppositely from the frame arrangement and medianly thereof, head support means adjustably supported by the other frame means, said other frame means including superposed and spaced frame structures, said head support means extending therebetween and including a portion adapted to extend through a central aperture in the head, and means for maintaining the head in predetermined position on the last mentioned portion.

2. Metal head collar forming apparatus including in combination, a forming die having a forming surface, the radius of which has a center, a forming shoe, U-shaped means pivotally supported on an axis coincident with that center, the shoe being supported by the mid-portion of the U-shaped means, a power cylinder and piston arrangement for tilting the U-shaped means, and means depending from the mid-portion of the U-shaped means and having its lower end connected to said arrangement.

3. Metal head collar forming apparatus including in combination, a forming die having a forming surface, the radius of which has a center, a forming shoe, U-shaped means pivotally supported on an axis coincident with that center, the shoe being supported by the mid-portion of the U-shaped means, a power cylinder and piston arrangement for tilting the U-shaped means, and means depending from the mid-portion of the U-shaped means and having its lower end connected to said arrangement and having an adjustable connection with the arrangement.

CHARLES E. SCHEURING.